(No Model.)

W. S. RABB.
HOE BLADE AND FASTENING.

No. 360,619. Patented Apr. 5, 1887.

WITNESSES:
Gustave Dieterich
Edgar Goodwin

INVENTOR
William S. Rabb
BY Rabb & Benjamin
his ATTORNEY

UNITED STATES PATENT OFFICE.

WILLIAM S. RABB, OF WINNSBOROUGH, ASSIGNOR OF ONE-HALF TO AUGUSTINE T. SMYTHE, OF CHARLESTON, SOUTH CAROLINA.

HOE-BLADE AND FASTENING.

SPECIFICATION forming part of Letters Patent No. 360,619, dated April 5, 1887.

Application filed February 17, 1887. Serial No. 227,907. (No model.)

*To all whom it may concern:*

Be it known that I, WILLIAM S. RABB, of Winnsborough, county of Fairfield, and State of South Carolina, have invented a new and useful Improvement in Hoe-Blades and Fastenings, of which I do hereby declare the following to be a full, clear, and exact description, reference being had to the accompanying drawings, forming part hereof.

My invention consists in a novel means of detachably connecting a hoe or like implement in the form of a plate or blade to its handle, and in a blade or plate adapted to said connecting device.

Figure 1:
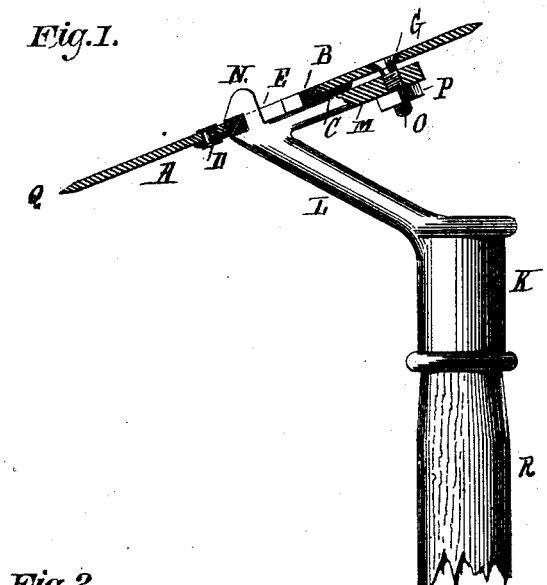
Figure 2:
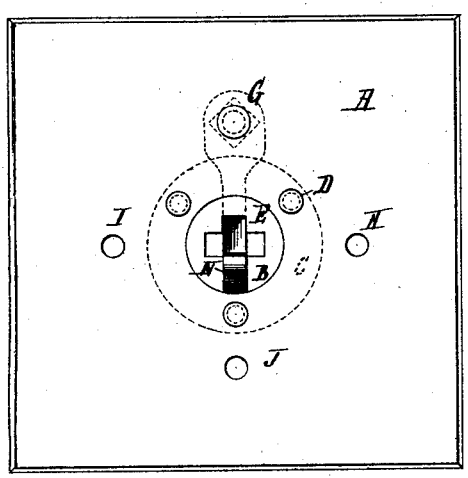
Figure 3:
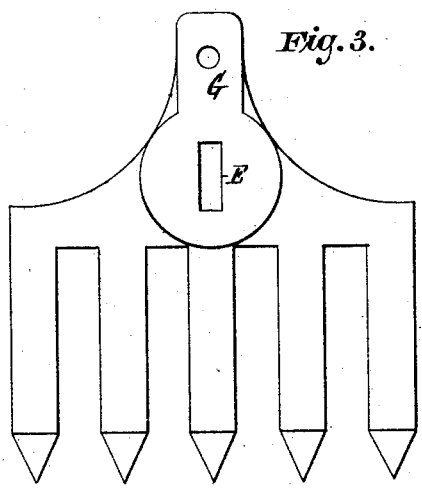

In the accompanying drawings, Figure 1 is a sectional view of a hoe embodying my invention. Fig. 2 is a front or plan view of the same. Fig. 3 represents a rake arranged to receive my said connecting device.

Similar letters of reference indicate like parts.

A is a hoe-blade, which I prefer to make, as here shown, square or four-edged. In the center of said blade is a circular opening, in which is secured a disk, B, on which is formed a flange, C. Rivets D, passing through said flange and blade, secure the disk to the said blade. In said disk is a cruciform aperture, E, formed by the intersection of two parallelogram-shaped apertures. In place of making this aperture cruciform, I may make it in the shape of a parallelogram, as shown in Fig. 2. In the blade A, and in line with and opposite the ends of the aperture E, I make openings G H I J.

K is a ring or ferrule adapted to receive the handle R. Upon said ferrule is formed or to it is attached a metal bar, L. At the extremity of said bar L is a bar, M, having at its outer end a circular opening. Also, at the extremity of bar L is a hook, N, having a rectangular notch or recess. The bar M protrudes rearwardly from and at right angles to the hook N.

The ferrule K, bar L, bar M, and hook N are preferably a single casting.

The above-described parts are assembled and connected together as follows: The hook N is inserted through the aperture E in the blade A and adjusted so that the edge of the disk B enters the recess in said hook. The thickness of said disk should be such that the disk will fit snugly in said recess. When this is done, the bar L will stand parallel to the rear side of the blade A, as shown in Fig. 1, and the opening in the end of the bar M will come opposite one of the apertures G H I J in the said blade. A bolt, O, is then inserted through the aperture G (for example) and the opening in the end of bar M, and nut P is applied to the threaded end of said bolt. On setting up the nut P all parts are firmly clamped together. By removing said nut the bolt O can be taken out and the hook N withdrawn from blade A.

It will be apparent that the aforesaid construction enables the blade to be very easily attached or detached from its handle or allows of the easy substitution of one implement for another—such as the rake shown in Fig. 3, for the hoe shown in Fig. 1—upon the same handle. My invention is specially applicable to a hoe, because it allows of the use of a many-edged blade, any edge of which can be brought into the operating position (that occupied by the edge Q, Fig. 1) at will by simply removing the blade and readjusting it upon its handle. The cruciform opening E facilitates this, as the hook N may be caused to engage at any one of the four ends of the openings, and as there are four apertures G H I J, one is always in line with the opening in bar N, so that the clamping bolt and nut may readily be placed in position.

The central disk, B, is not a necessary part of my invention, because I may obviously make the opening E in the blade A itself; but in practice I prefer to employ said disk and make the opening E therein before attaching it to the blade. The opening E, which receives the hook N, may be of any suitable shape to enable said hook to be inserted and adjusted, as described. It may have as many ends or points of attachment for the hook as there are sides or edges to the blade, and of course as many holes G H, &c., will be provided as there are possible places of attachment for the hook.

It will readily be apparent that, in addition to the advantages already named, my invention saves frequent regrinding of the blade, because all four edges of the latter can be used in turn before any sharpening is necessary.

This feature is of especial importance in the adaptation of the invention to use as a scraper.

I wish it understood that, although I show my invention here embodied in a hoe, I do not limit it to any particular application, because it is susceptible of many uses. Indeed it is of utility in any case where a plate of any shape or form is to be attached to the end of a handle so as to stand in a plane at an angle to said handle.

I claim—

1. In combination with a plate or blade of an agricultural implement, having suitable apertures, a bar, a hook upon the end of said bar adapted to enter an aperture in said plate and to receive in its recess the edge of said plate, a bar rigidly connected to said first-named bar and protruding rearwardly from said hook and at right angles thereto, and a bolt connecting the end of said last-named bar to said plate, substantially as described.

2. In combination with a plate or blade of an agricultural implement, having suitable apertures, a bar, a hook upon the end of said bar adapted to enter an aperture in said plate and to receive in its recess the edge of said plate, a bar rigidly connected to said first-named bar and protruding rearwardly from said hook and at right angles thereto, and a means (such as a threaded bolt and nut, the bolt passing through apertures in said bar and plate) of detachably connecting the extremity of said last-named bar to said plate, substantially as described.

3. The combination of the blade A, flanged disk B, secured thereto and provided with opening E, bar L, bar M, hook N, opening G, bolt O, and nut P, substantially as described.

4. The combination of the blade A, cruciform opening E, bar L, bar M, hook N, openings G H I J, bolt O, and nut P, substantially as described.

5. The combination of the blade A, opening E, bar L, bar M, hook N, opening G, bolt O, nut P, and ferrule K, the ferrule K, bar M, bar L, and hook N being in one piece, substantially as described.

W. S. RABB.

Witnesses:
Q. D. WILLIFORD,
T. K. SINNOTT.